United States Patent [19]

Brody et al.

[11] 3,962,499

[45] June 8, 1976

[54] PROCESS FOR COATING METAL SUBSTRATES

[75] Inventors: Donald E. Brody, Verona; Gabriel Karoly, Springfield, both of N.J.

[73] Assignee: M & T Chemicals Inc,, Greenwich, Conn.

[22] Filed: Apr. 17, 1974

[21] Appl. No.: 461,491

[52] U.S. Cl. .......................... 427/386; 260/29.2 EP; 427/388; 428/418

[51] Int. Cl.[2] ........................ B05D 3/02; B32B 15/08

[58] Field of Search ................ 117/132 BE, 161 ZB; 260/29.2 EP; 427/386, 388; 428/418

[56] References Cited

UNITED STATES PATENTS

| | | | |
|---|---|---|---|
| 3,336,253 | 8/1967 | Wong et al. | 117/132 BE |
| 3,519,602 | 7/1970 | Castro et al. | 117/132 BE |
| 3,632,559 | 1/1972 | Matter et al. | 260/29.2 EP |
| 3,715,335 | 2/1973 | Bacskai | 260/29.2 EP |
| 3,769,250 | 10/1973 | Nikles | 260/29.2 EP |
| 3,817,898 | 6/1974 | Ward | 260/29.2 EP |
| 3,839,252 | 10/1974 | Bosso et al. | 260/29.2 EP |

OTHER PUBLICATIONS (Lee et al.) *Handbook of Epoxy Resins*, pp. 11–1, 11–16, 11–17 (1967).

*Primary Examiner*—Harry J. Gwinnell
*Attorney, Agent, or Firm*—Robert P. Auber; Kenneth G. Wheeless; Robert Spector

[57] ABSTRACT

Durable, solvent resistant coatings are obtained by applying an aqueous composition containing the reaction product of a polyfunctional epoxide with a secondary amine or a dialkanolamine to a metal substrate and heating the resultant coated article to a temperature of 200°C to 300°C. in the absence of a curing agent. The aqueous composition contains substantially no unreacted epoxide radicals.

8 Claims, No Drawings

PROCESS FOR COATING METAL SUBSTRATES

BACKGROUND OF THE INVENTION

In recent years the trend in the coatings industry has been toward resin compositions which can be applied using water as the sole or major solvent with at most minor amounts of water-miscible organic liquids. In addition to the cost reduction achieved by employing water in place of more expensive organic solvents such as aromatic and aliphatic hydrocarbons and ketones, aqueous coating compositions are desirable because they generate minimal quantities of pollutants when the solvents are volatilized during baking, a conventional operation in the preparation of cured coatings.

U.S. Pat. No. 3,336,253 discloses potentially water-soluble reaction products of mono- or dialkanolamines with a variety of water-insoluble polymers, particularly epoxide polymers, containing end groups which are reactive with amines. The reaction products are converted to water-soluble materials following neutralization with an acid. The preferred products contain one unreacted epoxide radical per molecule, and are applied as coatings to various substrates, including glass fibers. The coatings are subsequently crosslinked by self-polymerization of the unreacted epoxide radicals. The presence of these epoxide radicals is detrimental to storage stability as they can react further, and may yield materials that are too viscous for use as coating materials. The aforementioned U.S. Pat. No. 3,336,253 teaches that the storage stability of epoxidealkanolamine products can be increased by reacting all of the epoxide groups using a variety of compounds, including additional dialkanolamine. This procedure is not desirable, since it would theoretically leave no sites for subsequent crosslinking considered necessary to obtain durable, solvent-resistant coatings. The patent discloses that coatings of these uncrosslinked polymers were considerably less adherent to metal substrates than cured coatings.

An objective of this invention is to provide a method for converting stable aqueous compositions to flexible, adherent and solvent-resistant coatings for metal substrates, including containers.

SUMMARY OF THE INVENTION

This invention provides a method for preparing durable, solvent-resistant coatings on metal substrates, the method consisting essentially of 1. applying to a surface of the substrate an aqueous solution containing between 20 and 40% by weight of an epoxide-amine reaction product exhibiting the general formula

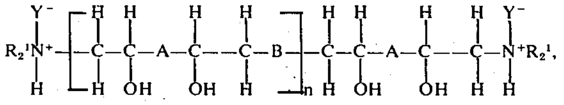

and 2. heating the coated substrate to between about 200° and 300°C. for a period of time sufficient to obtain a solvent-resistant coating.

In the foregoing formula $R^1$ represents an alkyl radical containing between 1 and 20 carbon atoms, a hydroxyalkyl radical containing 2 or 3 carbon atoms, a cycloalkyl, aryl, alkaryl or an aralkyl radical, A is selected from the group consisting of alkylene radicals containing between 1 and 20 carbon atoms, cycloalkylene, arylene, alkarylene and aralkylene radicals, residues of diglycidyl ethers of dihydric alcohols,

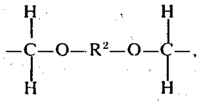

wherein $R^2$ is an alkylene radical containing between 2 and 20 carbon atoms and residues of diglycidyl ethers of dihydric phenols,

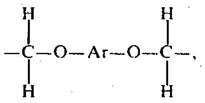

wherein Ar represents an arylene or an alkarylene radical, B represents a divalent radical of the formula $-O-[R^3O]_m-$,

or

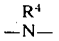

wherein $R^3$ represents an alkylene radical containing between 2 and 20 carbon atoms, $R^4$ is selected from the same group as $R^1$, $m$ represents an integer between 1 and 20, $n$ represents an integer between 0 and 20, inclusive, and Y represents an anionic radical obtained by removal of a proton from a mineral acid, a sulfonic acid or the carboxyl radical of a carboxylic acid.

The aqueous solvent for the epoxide-amine reaction product may optionally contain up to 50% by weight of water-miscible organic liquids.

DETAILED DESCRIPTION OF THE INVENTION

The film-forming materials used to prepare coatings in accordance with the method of this invention are reaction products of a) a compound containing two or more epoxide groups and b) a secondary amine or dialkanolamine.

In addition to the amine, difunctional polyols of the general formula $HO-[R^3O]_m-H$ wherein $R^3$ represents an alkylene radical containing between 2 and 20 carbon atoms and $m$ is an integer between 1 and 20, or primary amine of the formula $R^4NH_2$ are optionally reacted with the epoxide to form oligomers for the purpose of increasing molecular weight to obtain desired properties in the final coating. In some instances oligomer formation is necessary to maintain a coherent coating during the baking operation.

The relative amounts of epoxide, secondary amine and optional primary amine or polyol in the reaction mixture are adjusted to obtain a product containing substantially no epoxide radicals,

This product should not undergo self-polymerization to form crosslinked polymers. According to the teachings of the prior art, an external crosslinking agent capable of reacting with hydroxyl groups is required to impart solvent resistance to coatings of the present type. Typical crosslinking or curing agents are phenol-aldehyde resins and melamine-aldehyde resins. Most of these crosslinking agents are brittle materials that decrease the flexibility and impact resistance of coatings when employed in significant amounts. It is therefore considered surprising that the present amine-epoxide reaction products exhibit properties usually associated with crosslinked coatings when the products are heated to temperatures between 200° and 300°C. for as short a time as 3 minutes. As is well known in the coating art, optimum baking conditions will vary somewhat depending upon the particular film-forming polymer, and can readily be determined by routine experimentation. Small amounts of catalysts, usually between 0.05 and 3%, based on the weight of epoxide-amine reaction product, may accelerate curing of the coating. Preferred catalysts are pyrophosphoric acid, phosphoric acid and amine salts of these acids. In addition to accelerating the curing reaction, the catalysts improve adhesion of the coating to the substrate and reduce "brown spotting" resulting from attack of the coating material on iron or steel substrates. Baking at temperatures above 300°C. may cause discoloration and degradation of the coating, and should therefore be avoided.

PREPARATION OF THE EPOXIDE-AMINE REACTION PRODUCT

The polyfunctional epoxide compounds that are reacted with secondary amines or dialkanolamines to obtain the film-forming component of the present coating compositions are non-crosslinked and contain an average of two or more epoxide radicals,

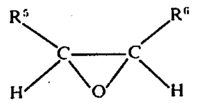

per molecule. The epoxide compounds can be grouped into two main classes, one of which is derived from the reaction of peracetic acid with linear or cyclic diolefins, e.g. vinylcyclohexene, or other compounds, including esters of unsaturated acids, that contain two or more carbon-carbon double bonds. The second class of epoxide compounds consists of glycidyl ethers obtained by reacting epichlorohydrin with a polyhydroxy compound. The latter can be an aliphatic diol or polyol, including hydroxyl-terminated polyethers, or a polyfunctional phenol. One type of epoxide often used for coating compositions includes the diglycidyl ethers of di- or bisphenols. These materials, as well as other suitable epoxides, can be either monomeric or a non-crosslinked reaction product of the polyfunctional epoxide molecule with itself or with compounds containing two or more functional groups that react with epoxides. Examples of the latter are carboxylic acids, amines and aliphatic or aromatic polyhydroxy compounds. The molecular weight of the epoxide compound can be between about 200 for the diglycidyl ethers of aliphatic diols to several thousand for the oligomers present in some of the commercially available diglycidyl ethers of Bisphenol A, which are represented by the general formula

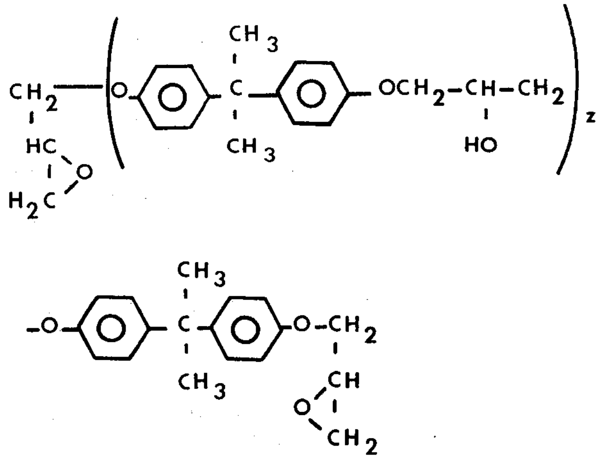

wherein $z$, the average degree of polymerization, represents a whole or fractional number between 0 and 2. These epoxide compounds are viscous water-insoluble liquids or low melting solids which are converted to water-soluble products following reaction with secondary amines as described in this specification. Alternatively, $R^5$ and $R^6$ of the foregoing formula can be joined by a carbon-carbon bond to form a cyclic structure which includes additional carbon atoms and optionally other polyvalent atoms such as nitrogen, oxygen and sulfur. An example of an epoxide radical wherein the carbon atoms form part of a cyclic structure is the epoxide derived from vinylcyclohexene, which exhibits the formula

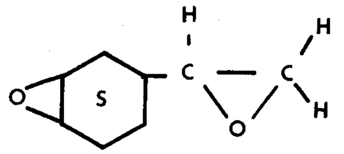

The choice of a particular epoxide compound is based on a number of factors, including cost and the properties desired in the cured coating.

The epoxide compound is reacted with a secondary amine of the general formula $R_2{}^1NH$ wherein $R^1$ represents specified monovalent hydrocarbon or hydroxyalkyl radicals as previously defined. Neutralization of the resultant amine residues with an acid renders the reaction product water soluble. Suitable neutralizing agents include mineral and carboxylic acids exhibiting a dissociation constant ($pK_a$) of less than 5.

The simplest amine-epoxide reaction product is one wherein one mole of amine is reacted with an equivalent weight of epoxide radical,

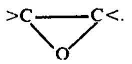

The number of epoxide radicals is conveniently expressed in terms of equivalents of oxirane oxygen. Assuming that the reaction is complete, each molecule of amine reacts with one epoxide radical, i.e. one atom of oxirane oxygen.

As previously disclosed, in some instances it may be desirable to form oligomers of the original polyfunctional epoxide molecule to obtain certain desired properties in the final coating. This can readily be accomplished during reaction of the epoxide with the secondary amine by employing a difunctional reagent in an amount sufficient to maintain the average functionality of all reagents at a value of two or less to avoid formation of crosslinked products. "Average functionality" as applied to the present epoxide-amine products is determined by the relative molar amounts of each reagent and the functionality ($n$) i.e. the number of reactive groups present, on each reagent and is conveniently defined in terms of the formula $$F = \frac{\Sigma \ (n_x \cdot M_x)}{M_t}$$

wherein $n_x$ represents the number of reactive groups present on a molecule of reagent $x$, $M_x$ represents the number of moles or the mole fraction of reagent $x$ and $M_t$ represents the total number of moles of reagents present or the integer 1 when $M_x$ is expressed in terms of mole fractions. For example, in a reaction mixture containing 2 moles of diethanolamine (functionality =1) and 4 moles of monoethanolamine (functionality =2), the average functionality (F) is equal to $$\frac{(2\times5)+(2\times2)+(2\times4)}{11} = \frac{20}{11} = 1.8.$$

If a compound containing an average of three or more epoxide groups per molecule were employed to prepare the epoxide-amine reaction product, the radical labeled A in the foregoing formula would contain one or more radicals of the formula

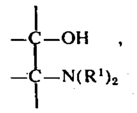

assuming that a sufficient quantity of the secondary amine were present to react with all of the side-chain epoxide radicals. The two carbon atoms in the formula are those of the original epoxide group

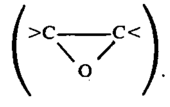

If a molecule of primary amine or polyol reacts with two molecules of a compound containing three or more epoxide radicals, the resultant product may exhibit a branched structure. In this instance formation of infusible, crosslinked products is avoided by maintaining the average functionality at 2 or less as described hereinbefore. As an example, using monoethanolamine, diethanolamine and a difunctional epoxide compound such as the monomeric diglycidyl ether of Bisphenol A, if it is desired to form a reaction product containing mainly the trimer of the epoxide compound, the molar ratio of epoxide:monoethanolamine:diethanolamine is 3:2:2. The stoichiometry of the reagents should be such that substantially no unreacted epoxide groups are present in the coating composition as it is applied to the metal substrate.

The primary and secondary amines that can be employed to prepare the present reaction products exhibit the the general formula $R^4NH_2$ and $R_2{}^1NH$, respectively. $R^1$ and $R^4$ are independently selected from alkyl radicals containing between 1 and 20 carbon atoms, hydroxyalkyl radicals containing 2 or 3 carbon atoms, cycloalkyl, aryl, alkaryl and aralkyl radicals. When $R^1$ and $R^4$ are alkyl radicals they can be methyl, ethyl, n-propyl, iso-propyl, n-butyl and other homologs containing up to 20 carbon atoms. Suitable cycloalkyl radicals include cyclopentyl, cyclohexyl and cyclooctyl. Alkaryl radicals include tolyl and xylyl. When $R^1$ and/or $R^4$ are aralkyl they can be benzyl or β-phenylethyl, among others. Diethanolamine and monoethanolamine represent preferred secondary and primary amines, respectively.

As previously disclosed, the primary amine can be partially or completely replaced by a divalent polyol of the formula $HO{+}R^3O{+}_mH$ wherein $R^3$ represents an alkylene radical and m is between 1 and 20, inclusive. Compounds wherein $m$ is 2 or more are commonly referred to as poly(alkylene glycols). If the value of $m$, which represents the average degree of polymerization, exceeds about 20 the epoxide-amine reaction products are often too viscous for acceptable coating materials.

The reaction between the epoxide, secondary amine and optional difunctional compounds is in most instances spontaneous and exothermic. The reaction mixture may require cooling to prevent charring of the reaction mixture or initiation of a self-polymerization of the epoxide to yield an infusible product. An inert organic solvent can optionally be employed as a diluent to reduce the viscosity of the reaction mixture or to dissipate the heat generated by the reaction. To facilitate the preparation of aqueous coating compositions directly from the present reaction products, any organic solvent present should be miscible with water. Suitable solvents include mono- and diethers of ethylene glycol, propylene glycol and hydroxyl terminated polyethers in addition to ketones and keto-alcohols such as diacetone alcohol.

PREPARATION OF AQUEOUS COATING COMPOSITIONS

The epoxide-amine reaction products described in the preceding section are either soluble in liquids containing more than 50% by weight of water or can be solubilized in these liquids by the addition of a mineral or carboxylic acid in an amount sufficient to neutralize at least a portion of the amine residues. Formic acid is preferred for this purpose because it is readily volatilized during baking of the final coating.

During or following neutralization and prior to application as a coating the epoxide-amine reaction products are diluted with water or a liquid containing at least 50% by weight of water, as required, to yield compositions containing between 20 and 40% by weight of non-volatile materials. The optimum concentration is dependent on a number of variables, including the viscosity of the reaction product and the method used to apply the coating. For example, a composition suitable for spraying is considerably lower in viscosity than one which will be applied using a doctor blade or a roller coater.

Compositions suitable for the present coating method may contain one or more pigments, surfactants and surface tension depressants such as silicones. These are conventional coating ingredients and additives and are well known in the art.

Between negligible amounts and 50% by weight, based on total volatile materials, of one or more water-miscible organic liquids can be present in the coating composition. The organic liquids may be required to solubilize or reduce the viscosity of the polyfunctional epoxide prior to and during reaction of the epoxide with the secondary amine and optional difunctional reagents. Preferred co-solvents are disclosed in the preceding section.

APPLICATION AND CURING OF THE COATINGS

The present aqueous coating compositions are readily applied to metal substrates using conventional techniques such as roller coating, dipping, spraying and spreading. A variety of conventional coating devices, including spray guns, roller coaters and doctor blades, can be employed for this purpose. Steel, copper, zinc, iron, tin, aluminum, magnesium and alloys containing these metals are representative of the types of substrates which can be coated using the method of this invention.

Epoxide-amine reaction products that have been at least partially neutralized with a mineral or carboxylic acid, thereby placing a positive charge on at least a portion of the molecules,.can be employed as electrophoretic coating materials. The positively charged particles of reaction product will be attracted to a metallic cathode that is immersed in the coating composition. A second electrode is immersed in the coating composition to function as the anode and complete the circuit. The technique of electrophoretic coating is extensively described in the literature, and a detailed description is therefore not required in the present specification.

The coated substrate is heated at temperatures between about 200° and 300°C. to "cure" the coating and develop the desired solvent resistance and durability that characterize crosslinked coatings. The ability of the present coatings to undergo what appears to be a curing at elevated temperatures is both advantageous and most surprising, since the molecules of epoxide-amine reaction product do not contain a curing agent or any functional groups which are known to react together and yield a crosslinked polymer.

Cured coatings prepared in accordance with the present method exhibit a unique combination of solvent-resistance and flexibility. This combination of properties is unusual because the crosslinked polymer structures often associated with solvent resistance are in many instances brittle and of relatively poor impact strength.

The following examples represent preferred embodiments of the various aspects of this invention and should not be interpreted as limiting the scope thereof. All parts and percentages are by weight unless otherwise specified.

The aqueous coating formulations described in the following examples were sprayed onto one surface of panels of 20 gauge cold rolled steel or 24 gauge phosphate treated steel. The baked coatings measured between 0.0005 and 0.0015 inch in thickness. Prior to baking the coatings were "tacky" after air drying for up to 1 hour. Coatings which cured during the baking cycle were gold to deep amber in color and showed no visible damage after being rubbed (50 strokes) with a rag saturated with either methyl ethyl ketone or the monobutyl ether of ethylene glycol. Both of these liquids are strong solvents for the uncured resin. Incompletely cured coatings were dissolved or swollen by these solvents.

The impact resistance of the coatings was evaluated using a Gardner Impact Tester. A weighted ball (total weight = 2 pounds) was dropped onto the uncoated side of the substrate from a given height. This is commonly referred to as a reverse impact test. The effect of the impact on the coating was noted.

EXAMPLE 1

A solution containing 2700 parts of a diglycidyl ether of Bisphenol A, [2,2 bis(4-hydroxyphenyl) propane], exhibiting an epoxy equivalent weight of 185 and a viscosity at 25°C. of 5000 -6000 centipoises, and 600 parts of ethylene glycol monobutyl ether was gradually added to a stirred mixture of 421.3 parts diethanolamine and 318.4 parts monoethanolamine. The temperature of the reaction mixture rose spontaneously to 82°C. and remained there throughout the addition and subsequent reaction. When the temperature decreased to 80°C. the reaction mixture was combined with 1000 parts of a 20% by weight aqueous solution of formic acid and 4000 parts of water to form a clear solution containing 41.6% by weight of non-volatile materials. A coating formulation was prepared using 184.6 parts of the solubilized reaction product, 41 parts of ethylene glycol monobutyl ether, 76 parts of water and 7 parts of a 40% by weight solution of butylamine pyrophosphate in ethanol as the curing catalyst. The formulation was sprayed onto steel panels, which were then baked at 232°C. for 15 minutes. The cured coating was not attacked by methyl ethyl ketone or the monobutyl ether of ethylene glycol and withstood a reverse impact of 24 inch pounds. The baked coating measured 0.0005 inch in thickness and was sufficiently flexible that it did not fracture when the coated panel was bent around a 0.25 inch-diameter mandrel through an angle of 180°.

EXAMPLE 2

A coating was prepared using the procedure described in Example 1. In addition to the ingredients of Example 1 the formulation also contained 14 parts of a 60% by weight aqueous solution of trimethylol phenol as a crosslinking agent for the epoxide reaction product. The cured coating was resistant to methyl ethyl ketone but fractured under a reverse impact of 4 inch pounds. The coating also fractured when the panel was bent through an angle of 180° as previously described.

This example demonstrates that a conventional crosslinking agent for coatings derived from epoxide compounds significantly decreases the flexibility of the cured coating.

EXAMPLE 3

This example demonstrates that acceptable coatings can be prepared using the present epoxide-amine reaction products in the absence of a catalyst or a crosslinking agent.

A coating was prepared using the formulation described in Example 1, the only difference being that the dibutylamine pyrophosphate was omitted from the formulation. After being baked for 15 minutes at 232°C. the coating was not affected by methyl ethyl ketone or the monobutyl ether of ethylene glycol and withstood a reverse impact of 12 inch pounds. The coated panel could be bent through an angle of 180° around a 0.25 inch-diameter mandrel without fracturing the coating.

EXAMPLE 4

This example demonstrates the effect of lower baking temperatures and/or shorter baking times on the curing of coatings described in the foregoing examples 1–3.

The coating of Example 3, which contained neither catalyst nor crosslinking agent, was softened or dissolved by methyl ethyl ketone if baked at a temperature below 232°C. The coating of Example 1, which contained a catalyst and no crosslinking agent, was not affected by methyl ethyl ketone after baking at 204°C. for 15 minutes, but was still soluble in methyl ethyl ketone after being heated at 177°C. for 15 minutes.

The results of these tests indicate that the presence of a suitable catalyst accelerates curing, thereby permitting use of lower temperatures and/or shorter baking times to obtain cured, solvent-resistant coatings.

EXAMPLE 5

This example demonstrates a coating composition wherein the relative concentrations of mono- and difunctional amines differ from those employed in the formulation of Example 1. The procedure of Example 1 was followed using the following quantities of reagents.

2700 parts diglycidyl ether of Bisphenol A
600 parts ethylene glycol monobutyl ether
366.4 parts monoethanolamine
315 parts diethanolamine The temperature of the reaction mixture rose spontaneously to 85°C. during addition of the solubilized diglycidyl ether. When the temperature decreased to 60°C. 100 parts of a 90% by weight aqueous solution of formic acid and 5000 parts of deionized water were added. The resultant clear, straw-colored solution was sprayed onto a steel panel and baked at 232°C. for 15 minutes. The properties of the coating were identical to those described for the coating of Example 3. The coating formulation contained 36.6% by weight of nonvolatile materials.

EXAMPLE 6

This example discloses a coating formulation wherein a portion of the difunctional amine is replaced by two difunctional polyols.

A reaction vessel equipped with a mechanically driven agitator and a thermometer was charged with 45.0 parts of triethylene glycol and 32.5 parts of a poly(ethylene glycol) exhibiting an average molecular weight of 600. Following the addition of 0.2 part of a boron trifluoride-diethyl ether complex, 85.0 parts of a diglycidyl ether of Bisphenol A were gradually added to the reaction vessel while the temperature was maintained below 64°C. When the epoxide equivalent of the reaction mixture reached 655 grams per equivalent of oxirane oxygen, which required about 1.5 hours of reaction time, 7.6 parts of monoethanolamine and 42 parts of the monobutyl ether of ethylene glycol were added, after which the temperature of the reaction mixture was maintained between 60° and 70°C. for 1 hour. 11.0 parts of diethanolamine were then added and the reaction allowed to continue for an additional hour. The product was then neutralized using 18.0 parts of an 88% by weight aqueous solution of formic acid, followed by the addition of 82 parts of distilled water. The resultant viscous liquid was pale amber in color and miscible with water in all proportions. A formulation prepared by combining this aqueous solution with 100 parts of deionized water and 7 parts of a 40% by weight ethanol solution of dibutylamine pyrophosphate was coated onto a steel panel. After baking at 232°C. for 15 minutes, the clear, amber colored coating measured 0.0005 inch in thickness and was insoluble in methyl ethyl ketone. The coating withstood a reverse impact of 6 inch pounds and did not fracture when bent through an angle of 180° around a 0.25 inch-diameter mandrel.

The following examples disclose the preparation of epoxide-amine reaction products that are suitable for use in the method of this invention.

EXAMPLE 7

The following amounts of reagents were blended in a reactor which was externally cooled as required to maintain the temperature of the mixture below 90°C.:

82.5 g. of the diglycidyl ether of bis(4-hydroxyphenyl) methane
12.2 g. of monoethanolamine
10.5 g. of diethanolamine
20.0 g. of ethylene glycol monobutyl ether The temperature of the reaction mixture rose from 25° to 90°C. over a period of 1 hour, at the end of which time 7 g. of a 90% aqueous solution of formic acid and 200 g. of water were added to the mixture. The product was a clear solution.

EXAMPLE 8

A mixture of 99.0 parts 3,4-epoxycyclohexylmethyl-3,4-epoxycyclohexane carboxylate, 21.0 parts diethanolamine, 12.2 parts monoethanolamine and 40 parts ethylene glycol monobutyl ether was heated with stirring for 6 hours, during which time the temperature of the mixture was maintained between 80° and 100°C. The reaction product was soluble in water without the addition of formic acid.

What is claimed is:

1. A method for preparing adherent, solventresistant coatings on metal substrates, said method consisting essentially of 1. coating a surface of the substrate with an aqueous solution containing between 20 and 40% by weight of an epoxide-amine reaction product exhibiting the general formula

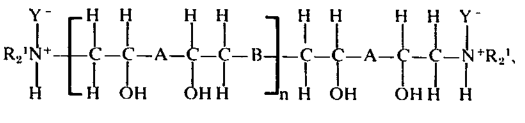

and 2. heating the coated substrate to between about 200° and 300°C. for a period of time sufficient to obtain a solvent-resistant coating, wherein $R^1$ represents an alkyl radical containing between 1 and 20 carbon atoms, a hydroxyalkyl radical containing 2 or 3 carbon atoms, a cycloalkyl, aryl, alkaryl or an aralkyl radical; A is selected from the group consisting of alkylene radicals containing between 1 and 20 carbon atoms, cycloalkylene, arylene, alkarylene and aralkylene radicals, residues of diglycidyl ethers of dihydric alcohols,

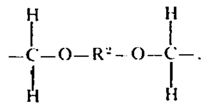

wherein $R^2$ is an alkylene radical containing between 2 and 20 carbon atoms and residues of diglycidyl ethers of dihydric phenols,

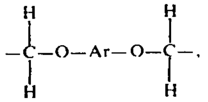

wherein Ar represents an arylene or an alkarylene radical; B represents a divalent radical selected from the group consisting of $-[O-R^3O]-_m$,

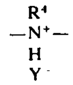

and

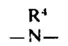

wherein $R^3$ represents an alkylene radical containing between 2 and 20 carbon atoms, $R^4$ is selected from the same group as $R^1$; *m* represents an integer between 1 and 20; *n* represents an integer between 9 and 20, inclusive, and Y represents an anionic radical obtained by removal of a proton from a mineral acid, a sulfonic acid or the carboxyl radical of a carboxylic acid.

2. A method as described in claim 1 wherein A represents the radical

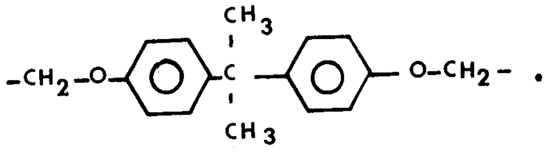

3. A method as described in claim 1 wherein $R^1$ and $R^4$ represent hydroxyethyl radicals.

4. A method as described in claim 1 wherein B represents $O-[R^3O]-_m$ and $R^3$ represents an ethylene radical.

5. A method as described in claim 1 wherein the aqueous solution contains up to 50%, based on the weight of volatile materials, of a water-miscible organic liquid.

6. A method as described in claim 1 wherein Y represents the residue of a carboxylic acid.

7. A method as described in claim 6 wherein the carboxylic acid is formic acid.

8. A method as described in claim 1 wherein the aqueous solution contains between 0.05 and 3%, based on the weight of said epoxide-amine reaction product, of a catalyst selected from the group consisting of pyrophosphoric acid, phosphoric acid and amine salts of pyrophosphoric and phosphoric acids.

* * * * *